July 24, 1923.
F. H. MOONEY
1,463,019
THREAD CUTTING MACHINE
Filed Oct. 25, 1920   4 Sheets-Sheet 1
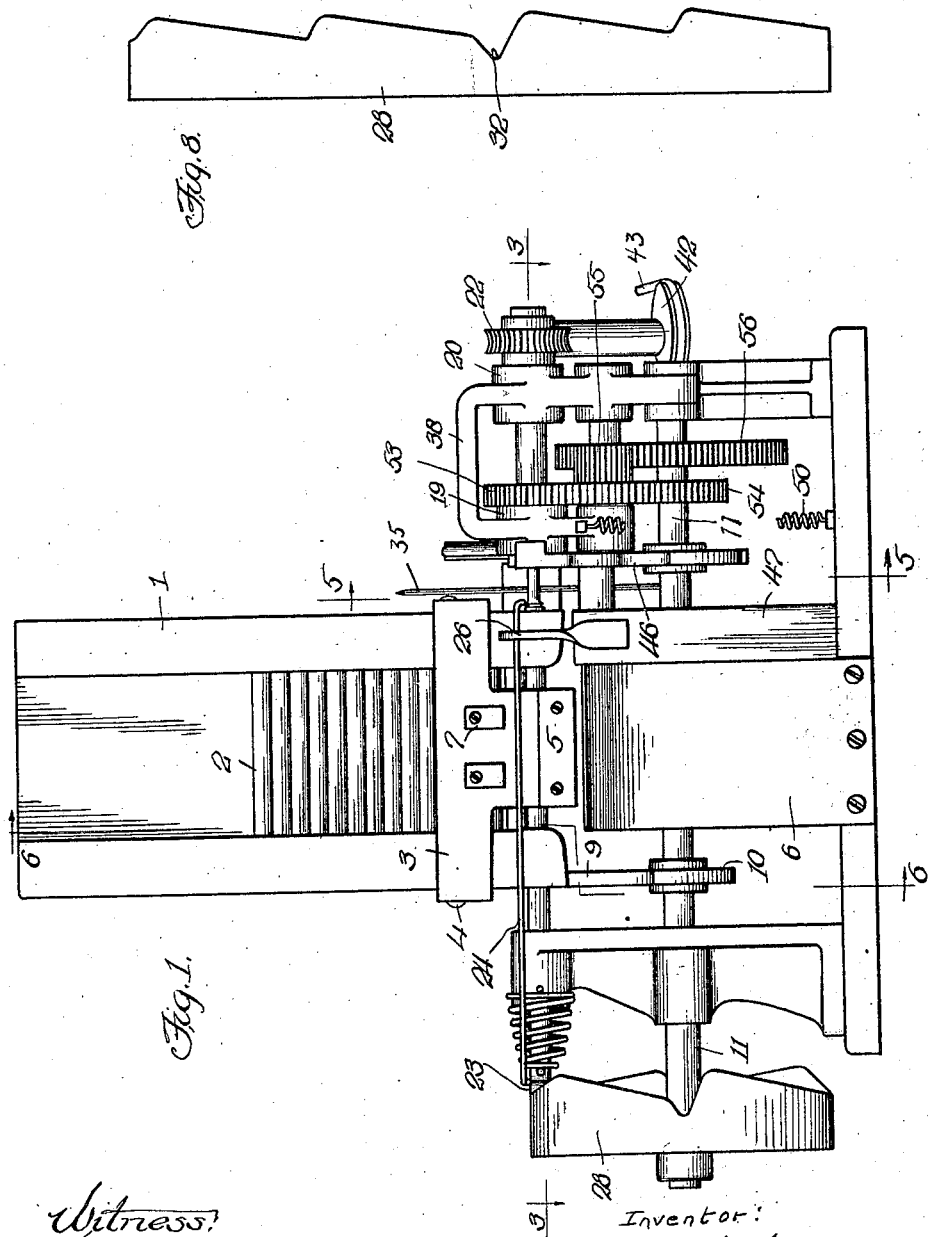
Inventor:
Frank H. Mooney
by Albert Scheible
Attorney

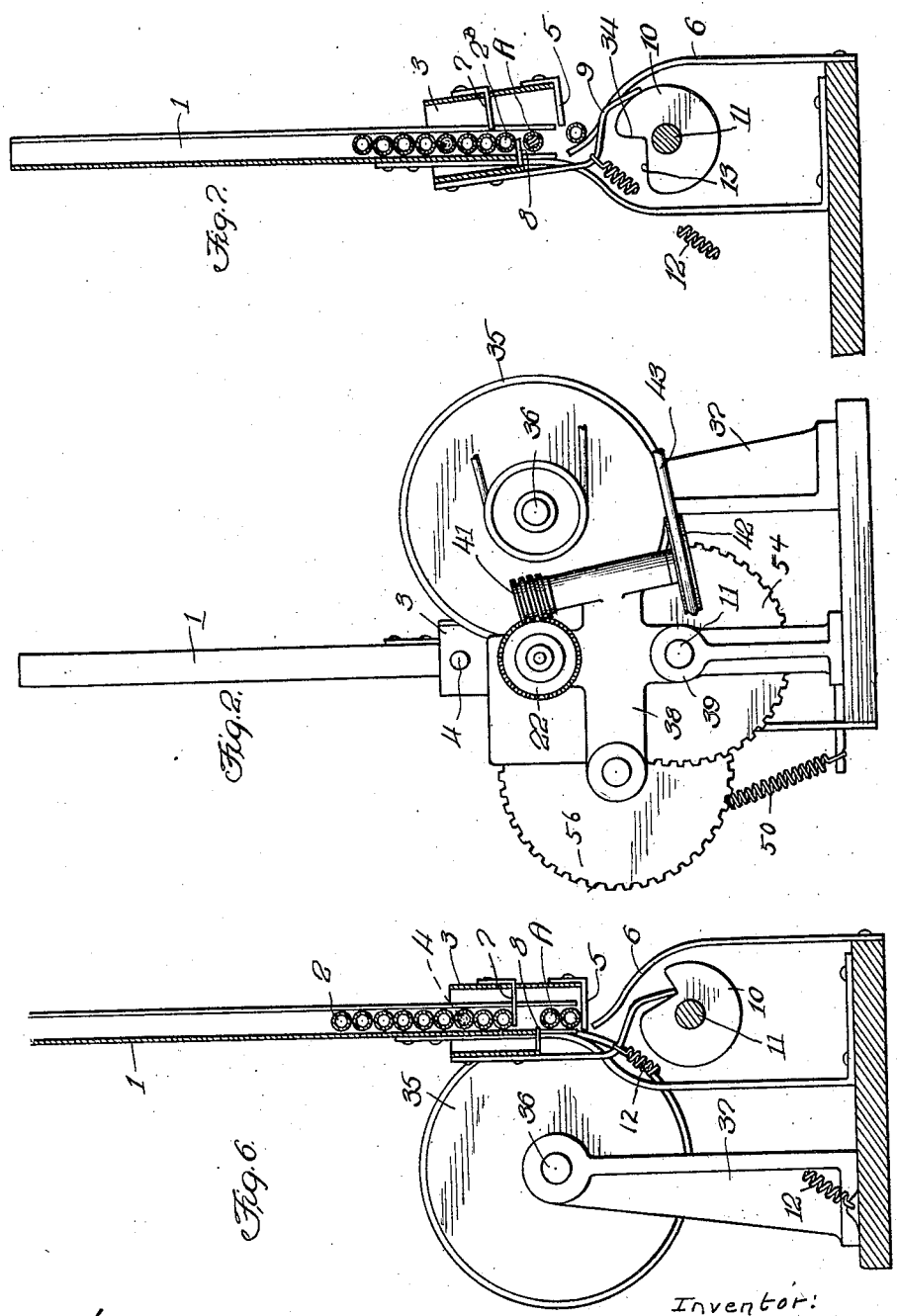

July 24, 1923.
F. H. MOONEY
THREAD CUTTING MACHINE
Filed Oct. 25, 1920
1,463,019
4 Sheets-Sheet 3
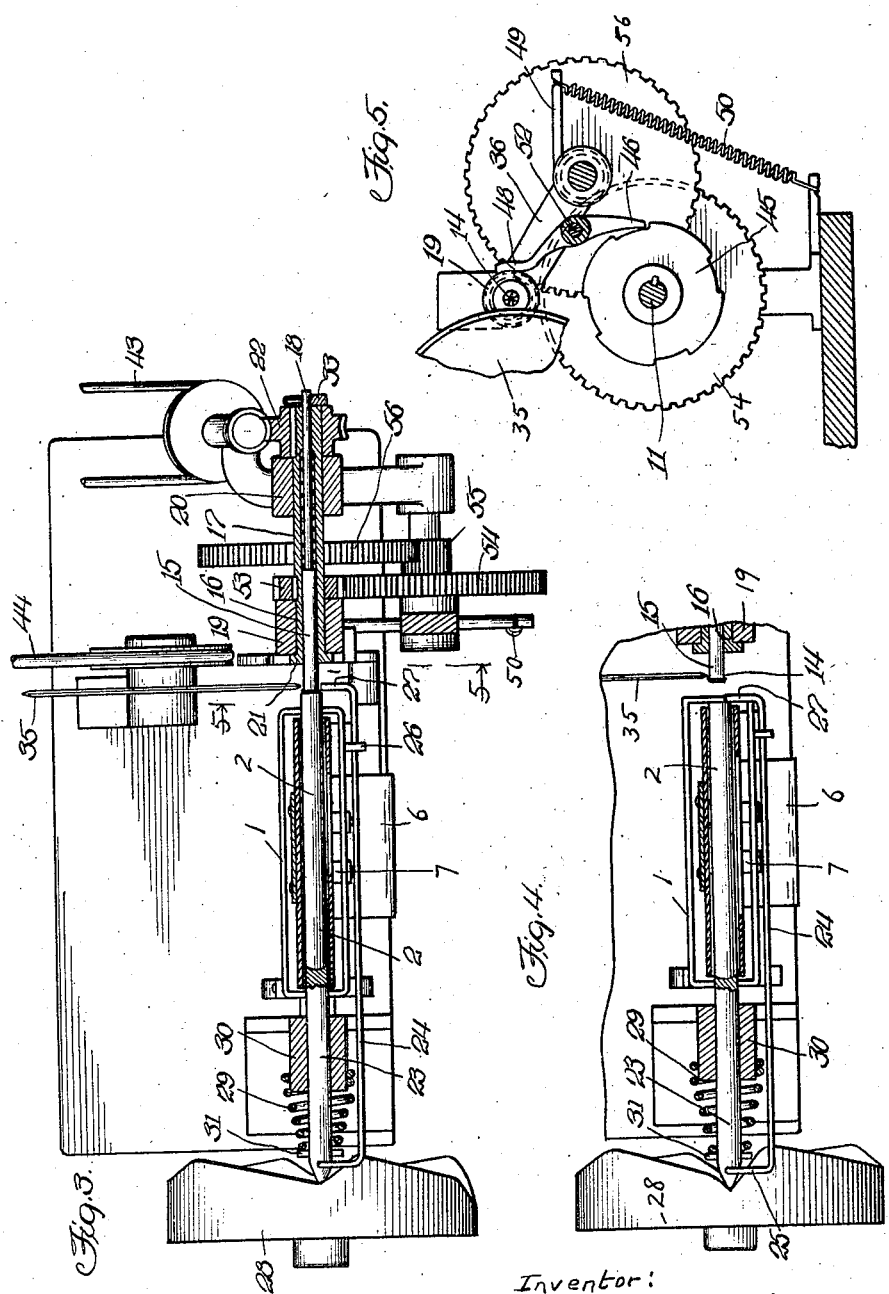
Witness:
W. K. O'Leary
Inventor:
Frank H. Mooney
by Albert Scheibl
Attorney July 24, 1923.

F. H. MOONEY

THREAD CUTTING MACHINE

Filed Oct. 25, 1920

Witness:
W. K. Olson

Inventor:
Frank H. Mooney
by Albert Scheible
Attorney

Patented July 24, 1923.

1,463,019

UNITED STATES PATENT OFFICE.

FRANK H. MOONEY, OF HINSDALE, ILLINOIS, ASSIGNOR TO CLARENCE E. BARRETT, OF CHICAGO, ILLINOIS.

THREAD-CUTTING MACHINE.

Application filed October 25, 1920. Serial No. 419,276.

*To all whom it may concern:*

Be it known that I, FRANK H. MOONEY, citizen of the United States, residing at Hinsdale, in the county of Du Page and State of Illinois, have invented certain new and useful Improvements in a Thread-Cutting Machine; and I do hereby declare the following to be a full, clear, and exact description of the invention, such as will enable others skilled in the art to which it appertains to make and use the same.

My invention relates to machines for cutting male threads, and in some of its general objects aims to provide means for employing a circular saw for such thread cutting, to utilize a circular saw for cutting multiple threads; and to provide means for automatically feeding the stock to and from the saw, so that the only attention required by the machine will be the occasional filling of a magazine with the stock which is to be threaded.

More particularly, my invention aims to provide novel and effective means for gripping the stock which is to be threaded, for bringing this stock into contact with a cutting edge while spirally advancing the stock, for rotating the stock to a predetermined extent between such successive engagement with a cutting edge (whereby to produce multiple threads), and for automatically discharging the threaded stock and feeding a new piece of stock into operative position.

Furthermore, my invention aims to provide means for pivotally supporting the stock at the end opposite that which is to be threaded, for moving the latter end of the stock with respect to a suitable cutting tool to produce a portion of a thread, for stripping the threaded stock off its supports when the threading has been completed, for temporarily supporting a succeeding piece of stock in position for being gripped, and for thereafter withdrawing the temporary support.

While the machine of my invention is applicable for many purposes, it is particularly adapted for threading the rubber barrels used on fountain pens, and I am therefore describing my invention in a machine suitable for this purpose, although I do not wish to be limited to such a purpose or to the particular embodiment here illustrated. Neither do I wish to be limited to the above named objects, as further and more detailed objects will appear from the following specification and from the accompanying drawings, in which—

Fig. 1 is a front view of a threading machine embodying my invention and showing the same as it appears during the interval between the cutting of successive multiple thread portions.

Fig. 2 is an end view of the same machine, taken from the right hand end of Fig. 1.

Fig. 3 is a horizontal section on line 3—3 through the same machine, taken along the axis of the stock which is being threaded and showing the parts as they appear during the interval between the cutting of multiple thread portions.

Fig. 4 is a fragmentary and horizontal section similar to Fig. 3, but taken after the threaded tube has been stripped off the spindle and which rotated the same.

Fig. 5 is a transverse vertical section taken along the correspondingly numbered line in Fig. 1 and showing the means for rocking the tube-rotating mechanism so as to move the tube into and out of engagement with the cutting edge of the circular saw which cuts the thread.

Fig. 6 is a transverse vertical section, taken along the correspondingly numbered zigzag line of Fig. 1 and showing the arrangement of the magazine for the supplying of tubes, and the means for controlling the feeding and the discharging of the tubes, this section being taken at the moment when a fresh tube has been gripped between the operative centers and before the previously threaded tube is entirely dropped.

Fig. 7 is a similar section taken after the previously threaded tube has been dropped upon the discharge guide and showing the tubes in the position which they occupy during the threading operation.

Fig 8 is a development of the periphery of the cam shown on the machine at the left hand of Fig. 1, namely the cam which reciprocates the spindle and the tube longitudinally.

Figure 9:
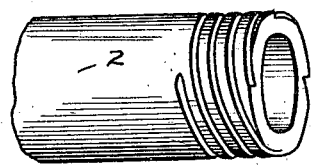

Fig. 9 is an enlarged perspective view of the open end of a fountain pen barrel threaded by means of my machine, showing the arrangement of the resulting thread portions.

Figure 10:
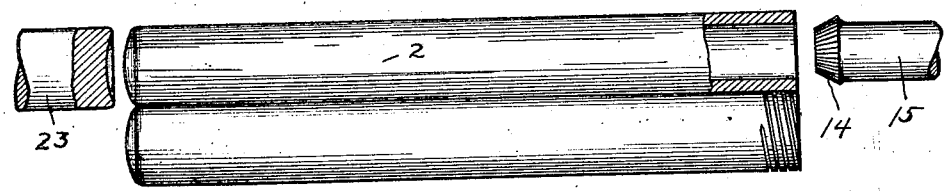

Fig. 10 is an enlarged elevation showing how the previously threaded barrel holds the freshly fed one with respect to the cooperating barrel gripping means.

Figure 11:
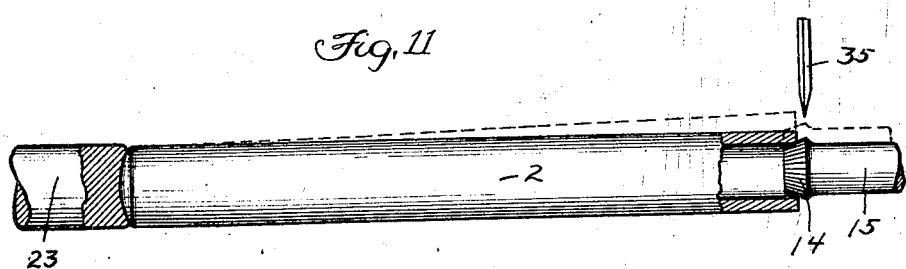

Fig. 11 is a fragmentary plan view showing the same freshly fed barrel after the cam has caused the holding means to grip the barrel, and also showing in dotted lines how the barrel is rocked about its closed end to bring it into position for engaging the saw.

Figure 12:
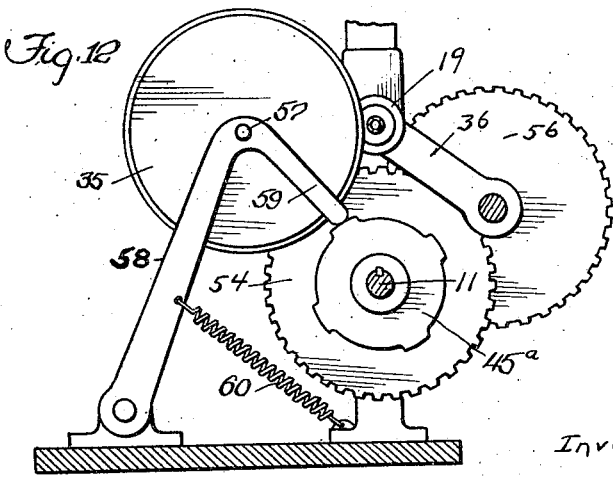

Fig. 12 is a somewhat diagrammatic view similar to Fig. 2 and showing the corresponding end of another embodiment of my invention, namely one in which the stock is rotated about a fixed axis and in which the saw arbor is moved with respect to this axis to bring the saw into and out of engagement with the stock.

Among the portions of my machine which enables me to accomplish the desired objects are the following:

1. Means for automatically feeding the stock into position for the operation of the threading mechanism, and for automatically discharging the stock after it has been threaded.

2. Means for automatically gripping the stock when it has been fed to a certain position, for thereafter rotating it during the threading operation, and for stripping the stock off the gripping means after the threading has been completed.

3. The means for longitudinally reciprocating the stock while being rotated, so that its longitudinal movement will cooperate with its rotation in producing a spiral thread by the engagement of the stock with the cutting edge of the saw.

4. Means for rocking the stock transversely of its axis about its tail end to bring its other end into and out of engagement with the cutting edge of the saw.

5. Means for reducing the speed to secure the proper time relation between the parts of the mechanism which respectively move the stock rotationally, longitudinally and transversely.

Referring first to the stock feeding and discharging mechanism, this is here shown as including a magazine comprising a vertical tube of a rectangular section slightly larger than the longitudinal contour of each of the rubber barrels which is to be threaded. This magazine or chute 1 desirably has a middle portion of its front cut away as shown in Fig. 1, so as to afford an opening through which the operator can readily see the extent to which the magazine is supplied with the rubber barrels 2. Rockingly mounted on this magazine is a control member consisting of a frame 3 secured to sides of the magazine by pivot pins 4 at a point somewhat above the axis on which each barrel is to be manipulated during the threading operation. The frame 3 carries three horizontal fingers or ledges, of which the lower ledge 5 is disposed below the lower end of the magazine 1 and is adapted to prevent the dropping of a discharged barrel out of the magazine and upon the curved guard 6 which guides the discharged tube away from the mechanism of the machine. This ledge 5 desirably extends rearwardly from the front of the rocking frame 3 and has its upper face spaced from the axis of the barrel which is being threaded by substantially one-and-one-half times the diameter of each barrel. The upper ledge 7 has its lower face spaced from the same axis by approximately the same distance and also extends rearwardly from the front of the rocker frame 3. The intermediate ledge 8 extends forwardly from the rear of the said frame at a distance below the upper ledge 7 corresponding substantially to the diameter of one of the barrels. The three ledges are of such a length transversely of the machine that the upper and lower ledges intercept the passage of tubes through the magazine when the rocking control frame is in its normal position of Fig. 3, while the intermediate ledge 8 is clear of the bore of the magazine in this position: however, this intermediate ledge intercepts the downward passage of tubes in the magazine when the rocking frame is tilted to the discharge position of Fig. 7, in which latter position the upper and lower ledges are both out of alinement with the bore of the magazine or chute.

To control the movements of this magazine-controlling member, I desirably provide the rear of the pivoted frame 3 with a downwardly extending arm 9 which continuously engages a cam 10 on a cam shaft 11 driven by means hereafter described. This cam has the major portion of its face equidistant from its axis, so that the arm 9 will hold the control member in the position of Fig. 7 for the greater part of each revolution of this cam, or during the threading of the barrel which is held by means hereafter described on an axis A (corresponding to the plane in which the section of Fig. 3 was taken) just below the intermediate ledge 8 of the control member. However, the arm 9 is continuously urged towards the left of Fig. 7 by a spring 12 attached to some rigid part of the machine, so that this arm is swung into the position of Fig. 6 as soon as the tip of the arm reaches the recess in the periphery of the cam. This occurs substantially at the same time that the previously threaded barrel is released from the means which hold the same on the axis A during the threading operation, as hereafter described, so that the swinging movement of the control member simultaneously releases the tube 2 immediately above the intermediate ledge 8 and moves the lower ledge 5 under the outlet of the magazine. This ledge 5 thereupon supports the previously threaded barrel temporarily as shown in Fig. 6, while the barrel 2ᴮ of Fig. 7 drops upon this other barrel and is momentarily supported by the latter in alinement with the axis A as shown in Figs. 6 and 10. The upper of these two barrels is then in position for being gripped by the part of the mechanism which manipulates the barrel during the threading of the latter. At the same time, the upper ledge 7 prevents other barrels from following down the magazine. Then when the arm 9 reaches the shoulder 13 of the said recess in the cam 10, this shoulder swings the rocking frame back to its position of Fig. 7, thereby allowing another barrel to drop from above the upper ledge 7 upon the intermediate ledge 8, while also allowing the previously threaded barrel to roll down upon the guard 6 which guides it entirely out of the machine.

For rotating each of the barrels while substantially alined with the axis A, I provide a pair of alined holding members adapted to engage the opposite ends of the barrel and desirably arrange these so that they can be moved away from each other to permit the threaded barrel to be discharged and to permit an unthreaded barrel to be dropped between these holding members. I also desirably arrange these cooperating holding members so that both of them can be slid longitudinally of the stock gripped between them, to afford the desired longitudinal movement of the stock during the threading.

For this purpose, I am here showing the open end of the barrel which is to be threaded as engaged by a knurled head 14 on a spindle 15 which is freely slidable in a bushing 16, but which spindle is continuously urged toward the barrel by a spring 17 surrounding a reduced shank portion 18 of the spindle. The bushing 16 is freely rotatable in journals 19 and 20 forming part of a rocker frame as hereafter described, but this bushing is kept from sliding in one direction by an enlarged head 21 engaging a face of the journal 19 and in the other direction by a worm wheel 22 which is splined to the outer end of the bushing 16 and which affords part of the means for rotating the spindle 15.

For holding the other end of the barrel which is to be threaded, I provide a socketing stem 23 having a cupped end adapted to receive the convexed end of the rubber barrel 2, and to cooperate with the knurled and tapering head of the spindle 15 in holding the barrel substantially in alinement with the socketing stem 23 and the spindle 15. However, the stem 23 need not rotate, but may permit the barrel to rotate with respect to it, and in practice this stem 23 is desirably kept from rotating by a stripper member 24 which has at one end an arm 25 terminating in a downwardly directed finger engaging a vertical perforation in the stem 23. This arm extends through a bore in a wing 26 projecting forwardly from the magazine 1, and has at its other end a finger 27 arranged for stripping the threaded barrel off the head of the spindle 15, as hereafter described. At its outer end, the stem 23 is flattened substantially to a V-section when viewed from the top of the machine, so that its extreme tip affords an engagement on a radial line with a cam 28 mounted on the cam shaft 11 which extends directly below the spindle. This cam has its rim formed after the manner shown in the development of Fig. 8, so that during each rotation it will tend to reciprocate the stem 23 longitudinally of the latter four times by slowly moving the said stem to the right, then quickly permitting it to return to the left, then slowly moving it to the right again, and so on. To keep the tip of the stem 23 in engagement with the operative edge of the cam 28, I interpose a spring 29 between the bearing 30 (which forms part of the supporting member of the machine and in which the stem 23 is slidably mounted) and a pin 31 extending transversely through the said spindle.

With the parts thus arranged, the spring 29 causes the stem 23 to follow the contour of the cam 28 continuously, while the spring 17 holds the barrel 2 clamped between the rotating spindle 15 and the socketing stem 23, so that this barrel must follow the longitudinal motion imparted to the said stem by the cam 28. Consequently, the barrel of said stem undergoes four complete reciprocations during each revolution of the cam 28. Then when the fourth reciprocation is completed, the tip of the stem 23 enters the extra deep recess formation 32 in the cam 28 which is shown in the development of Fig. 8, thereby permitting the spring 29 to act through the stem 23 in moving the stripper 24 towards the left of the machine to such an extent that this finger 27 engages the right hand end of the rubber barrel. This causes the stripper to slide the barrel off the spindle 15, which spindle is limited in its travel towards the left of the machine by a washer 33 pinned to the outer end of the spindle shank 18 and adapted to engage the outer face of the worm wheel 22. Consequently, the stripper when moved to this position will draw the rubber barrel entirely free of the spindle 15 as shown in Fig. 4, so as to permit the threaded barrel to drop by gravity off the slightly concaved end of the stem 23. Being mounted on the same shaft 11, the cams 28 and 10 rotate in unison, and the recess 32 on the former is substantially in alinement radially of the said shaft with the cam face 34 on the cam 10. Consequently, the stripping of the threaded barrel off the spindle occurs substantially at the same time that the cam 10 permits the magazine controlling member to be rocked to the position of Fig. 6, and this control member therefore automatically supports the freshly fed tube in position for being gripped between the stem 23 and the spindle 15. Then as the tip of the stem 23 is moved to the right while leaving the said recess 32 in the cam, this stem engages the closed end of the freshly fed barrel and slides the mouth of the barrel upon the tapering knurled head 14 of the spindle 15, so as to support this barrel during the manipulation required for threading the same.

For cutting the thread, I employ a simple circular saw 35 having its arbor 36 journaled in a bracket 37 forming part of the supporting member of the machine, and connect the arbor of this saw through a belt 44 to a suitable pulley (not here shown), so that this saw rotates continuously about a fixed axis. Then I utilize the socketing engagement between the sliding stem 23 and the closed end of the rubber barrel for permitting the barrel to be rocked horizontally about its closed end while swinging it into and out of a position in which it can engage the edge of the saw. With this in view, I do not make the bearings 19 and 20 stationary, but make these portions of a rocker frame 38 which is pivoted on the cam shaft 11 as shown in Figs. 1 and 2. The rocker frame 38 carries a bearing for a worm 41 engaging the worm wheel 22 which rotates the spindle 15 as heretofore described, and this worm 41 is fast with respect to a pulley 42 driven by a belt 43, both this belt and the belt 44 for operating the saw being connected to common driving means not shown in the drawings.

With the spindle 15 and the driving means for the same thus mounted on a rocking frame, it will be evident from Fig. 2 that by rocking this frame on the cam shaft 11 the spindle can be moved transversely, so as to move the open end of the barrel either towards the edge of the saw or away from the latter. Since the spindle is smaller in diameter than the barrel which is to be threaded, this rocking movement can bring the parts to the position of Fig. 3, with the edge of the saw slightly overhanging the open end of the barrel after the manner in dotted lines in Fig. 11. Then as the continuously rotating barrel is moved towards the right of Fig. 3 by the action of the cam 28, the edge of the saw will engage the surface of the barrel and will cut a spiral groove leading from the open end of the barrel, the length of this groove being defined by one of the long sloping faces of the cam 28. When the tip of this sloping face has been reached, the short return face will permit the springs 29 and 17 to move the barrel back longitudinally to its starting point during a relatively small rotational movement of the barrel, thereby affording a fresh starting point for the next spiral cut of the saw, so that by suitably proportioning the various parts of the mechanism I can use an ordinary circular saw for producing multiple threads symmetrically disposed with respect to the axis of the barrel.

To prevent the saw from cutting across the threads during each longitudinal return movement of the barrel, I move the barrel back transversely or away from the cutting edge of the saw as soon as the end of each thread portion has been cut. This movement, as well as the initial swinging of the barrel towards the saw and the holding of the barrel in engagement with the cutting edge of the saw, are all accomplished by the simple cam mechanism shown in Fig. 5, which mechanism controls the rocking of the frame 38 about its mounting on the cam shaft 11. Keyed to the shaft 11 is a cam 45 having its peripheral portions alternately of two different diameters and continuously engaging one end 46 of a rocking lever which is pivoted to a stationary riser 47 on the supporting member of the machine and which has its other end 48 bearing continuously against the journal 19 which forms part of the said rocking member 38. This rocking member also has an arm 49 connected by a spring 50 with a rigid part of the supporting member, whereby this spring continuously tends to move the rocker frame 38 in a counter-clockwise direction in Fig. 2, or in a direction in which it will move the spindle 15 away from the saw. Such a movement is permitted whenever the end 46 of the control lever engages the smaller diametered part of the cam. However, when this arm of the lever is reached by one of the larger diametered cam portions, the latter acts through the said lever to push the rocking frame away from the pivot 52 of the lever, and since this pivot is on the stationary riser 47 of the supporting member, the resulting thrust rocks the rocking member about its pivotal mounting. Consequently, the spindle 15 is moved horizontally towards the saw and is held in engagement with the latter as long as the arm 46 of the control lever rides on the larger diametered portion of the cam 45. Then as soon as this portion of the cam passes the arm 46 of the lever, the spring 50 will cause the rocker arm to return to its former position, thereby bringing the barrel out of the path of the saw. By suitably mounting the cam 45 with regard to the cams 28 and 10, I can readily time this movement so that the withdrawal of the barrel from the saw affords the desired interval for returning the barrel longitudinally to a fresh starting point for another thread portion, and finally for discharging the threaded barrel and gripping the next one.

In practice, each thread portion desirably extends for a number of turns around the barrel, so that the three cams must be rotated at a considerably lower rate of speed than the spindle 15. I therefore desirably provide a speed reduction carried by the rocker frame. For instance, I am here showing the bushing 16 in Fig. 3 as being keyed to a pinion 53 meshing with a gear 54. This latter gear is fast upon a pinion 55 which meshes with a gear 56 keyed to the cam shaft 11. Thus arranged, the single drive from the belt 43 through the worm wheel 22 affords means for driving all of the moving parts of the mechanism excepting the circular saw, and since all of these parts are connected through gearing and cams of definitely proportioned ratios, I can insure a proper relative movement of all of the parts, while leaving the rate of rotation of the saw free to be adjusted independently according to the condition of the saw and the hardness of the stock.

However, while I have illustrated and described my invention in a highly desirable embodiment, I do not wish to be limited to the details of the construction and arrangement here disclosed, it being obvious that various alterations might be made without departing from the spirit of my invention or from the appended claims. For example, it will be evident that the transverse movement of the stock-holding means with respect to the stationary arbor of the saw is only a relative movement, and that the same general effect might be obtained by leaving the axis of the stock-gripping spindle stationary and moving the saw arbor back and forth. Thus, Fig. 12 shows an end of a machine designed in this manner and having the saw arbor 57 journaled in a rocker arm 58 which is pivoted on the supporting base of the machine and which also has a thrust arm 59 bearing against the periphery of a cam 45<sup>A</sup> and urged towards the latter by a spring 60. Whenever the tip of this thrust arm engages one of the radially larger cam portions, the arm is swung to the left in Fig. 12, thus moving the saw away from the stock. But when the thrust arm 59 engages the smaller diametered part of the cam 45<sup>A</sup>, the spring 60 swings the rocker arm into a position corresponding to that of Fig. 5, thereby bringing the saw into its cutting position.

I claim as my invention:

1. In a threading machine, a circular saw, means for continuously rotating the stock about an axis substantially parallel to that of the saw, means for intermittently bringing the stock into engagement with the edge of the saw, and means for longitudinally moving the stock in one direction during its saw-engaging periods and for moving the stock in the opposite direction during the intervals between such periods.

2. In a threading machine, a pair of alined socketing means respectively engaging opposite ends of the stock, means for spirally advancing the stock while thus engaged, a circular saw, and sequentially operative means for moving one of the socketing means transversely of the stock so as to bring the latter into engagement with the edge of the saw, for moving the last named socketing means in the opposite direction, and for increasing the spacing between the two socketing means to cause the latter to release the stock.

3. In a threading machine, a pair of alined socketing means respectively engaging opposite ends of the stock, spring means continuously urging the said socketing means towards each other, means for continuously rotating one of the socketing means, cam means for longitudinally reciprocating one of the socketing means, a circular saw mounted on an axis substantially parallel to that of the stock engaged by the said socketing means, and means for reciprocating one of the socketing means transversely of the stock so as to bring the stock into and out of engagement with the edge of the saw.

4. In a threading machine, a circular saw, means for holding the stock with the axis of the latter substantially parallel to the axis of the saw and for continuously rotating the stock about its own axis, a pair of continuously rotating cams, means controlled by one of the cams for moving the stock-holding means longitudinally of the stock; and means controlled by the other cam for moving the stock towards the edge of the saw for holding the stock against the said edge during a predetermined rotational movement of the stock and for thereafter moving the stock away from the saw.

5. In a threading machine, a circular saw, a support for the same, a rocker frame pivoted on the support, stock-manipulating means carried partly by the support and partly by the rocker frame and including means for rotating the stock and means for longitudinally moving the stock, and speed reducing means carried by the rocker frame and operatively interposed between the said stock-rotating and stock-moving means.

6. In a threading machine, a circular saw, a support for the same, a rocker frame pivoted on the support, stock-manipulating means carried partly by the support and partly by the rocker frame and including means for rotating the stock and means for transversely moving the stock, and speed reducing means carried by the rocker frame and operatively interposed between the said stock-rotating and stock moving means.

7. In a threading machine, a pair of substantially alined stock-holding means adapted to support the stock between them and both mounted for sliding longitudinally of the stock, the first of the said holding means being arranged for engaging the adjacent end of the stock to prevent relative rotation thereof, means urging both of the holding means towards each other, means for restricting the movement of the first named holding means in the said direction, cutting means adapted to engage the stock, means for rotating the first holding means and thereby rotating the stock; cam means cooperating with the said urging means for moving the stock longitudinally, whereby the said longitudinal movement will coact with the rotating of the stock to cause the cutting means to thread the stock, and means associated with the cam means for stripping the stock off the first named holding means.

8. In a threading machine, a circular saw, a magazine adjacent thereto and arranged for holding superposed stock, means for releasing the lowermost stock from the magazine, automatic means for manipulating the said released stock so as to cause the saw to cut a thread upon the stock; and consecutively operating means for thereafter releasing the threaded stock from the manipulating means, holding it temporarily at a predetermined distance below the position occupied by it during the said manipulating, and then discharging the stock; the said temporary holding means being so arranged that the stock held thereby supports the next stock item in position for engagement by the stock-manipulating means.

9. In a threading machine, a pair of alined holding means cooperating to hold the stock between them during the threading, and a stripper carried by one of the holding means and arranged for stripping the threaded stock off the other holding means.

10. In a thread cutter, stock-rotating means, a continuously rotating circular saw, a reciprocable mounting for the stock-rotating means, means for moving the said mounting to hold the saw against the rotating stock during a predetermined rotational movement of the latter, means for moving the mounting in the other direction to keep the stock clear of the saw for a time interval, and means for moving the stock in one direction during the said predetermined rotational movement thereof and in the opposite direction during the said time interval.

Signed at Chicago, Illinois, October 20, 1920.

FRANK H. MOONEY.